(12) United States Patent
Kim et al.

(10) Patent No.: US 7,768,991 B2
(45) Date of Patent: Aug. 3, 2010

(54) METHOD AND SYSTEM FOR DETERMINING STATE OF NODE DURING RESERVED SLOT IN WIRELESS NETWORK

(75) Inventors: Yong-suk Kim, Daejeon (KR); Won-yong Yoon, Sungnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1068 days.

(21) Appl. No.: 11/116,400

(22) Filed: Apr. 28, 2005

(65) Prior Publication Data

US 2005/0243795 A1 Nov. 3, 2005

Related U.S. Application Data

(60) Provisional application No. 60/565,875, filed on Apr. 28, 2004.

(30) Foreign Application Priority Data

Dec. 10, 2004 (KR) ........................ 10-2004-0104054

(51) Int. Cl.
H04B 7/212 (2006.01)
(52) U.S. Cl. ...................... 370/347; 370/310
(58) Field of Classification Search ................. 370/347, 370/386; 455/69
See application file for complete search history.

(56) References Cited

U.S. PATENT DOCUMENTS

| | | | |
|---|---|---|---|
| 2002/0132586 A1* | 9/2002 | Chen et al. | 455/69 |
| 2002/0141375 A1* | 10/2002 | Choi | 370/347 |
| 2002/0163933 A1 | 11/2002 | Benveniste | |
| 2003/0152041 A1* | 8/2003 | Herrmann et al. | 370/310 |
| 2003/0174664 A1 | 9/2003 | Benveniste | |
| 2009/0221325 A1* | 9/2009 | Periyalwar et al. | 455/552.1 |

FOREIGN PATENT DOCUMENTS

KR 1020030055641 A 4/2003

OTHER PUBLICATIONS

Office Action issued in Korean Patent Application No. 2004-104054, Feb. 26, 2007.

* cited by examiner

*Primary Examiner*—Lester Kincaid
*Assistant Examiner*—Phuoc Doan
(74) *Attorney, Agent, or Firm*—Sughrue Mion, PLLC

(57) ABSTRACT

A method and system for determining a state of a first node in a wireless network consisting of a plurality of nodes. The first node determines one of at least two power sensitivity levels by considering at least one of an available power and a standby packet. The first node determines whether it remains in active state or inactive state by considering a power sensitivity level transmitted from at least one second node which corresponds to the first node and the determined power sensitivity level. Also, the corresponding node has an identical state to the first node, so that unnecessary power consumption can be prevented.

13 Claims, 3 Drawing Sheets

FIG. 4

| B·P | TIME SLOT 0 | TIME SLOT 1 | TIME SLOT 2 | TIME SLOT 3 |
|---|---|---|---|---|
| | A → B | A → B | B → C | E → D |
| | SOFT RESERVATION SLOT | EDCA SLOT | HARD RESERVATION SLOT | SOFT RESERVATION SLOT |

FIG. 5

| B·P | TIME SLOT 0 | TIME SLOT 1 | TIME SLOT 2 | TIME SLOT 3 |
|---|---|---|---|---|
| | A → B | E → F | G → H | |
| | SOFT RESERVATION SLOT | HARD RESERVATION SLOT | SOFT RESERVATION SLOT | EDCA SLOT |

METHOD AND SYSTEM FOR DETERMINING STATE OF NODE DURING RESERVED SLOT IN WIRELESS NETWORK

CROSS-REFERENCED TO RELATED APPLICATIONS

This application claims the benefit of U.S. Provisional Application No. 60/565,875 filed on Apr. 28, 2004, and Korean Patent Application No 2004-104054 filed on Dec. 10, 2004, in the Korean Intellectual Property Office, the disclosures of which are incorporated herein in their entirety.

BACKGROUND OF THE INVENTION

1. Field of the Invention

The present invention relates to a wireless network consisting of a plurality of nodes. More particularly, the present invention relates to a method and system for reducing unnecessary power consumption of a node in a wireless network during a time slot reserved by the node.

2. Description of the Related Art

A wireless network typically consists of a plurality of nodes. The nodes of the wireless network transmit and receive data to and from one another. The node has a regulation in order to transmit and receive data. More specifically, data experience a collision on the network when at least two nodes transmit data at the same time, and thus, a receiver node receives error-containing data. Accordingly, the nodes in the wireless network have to avoid transmitting data at the same time.

A structure of a wireless network will now be described with reference to FIG. 1. FIG. 1 illustrates a wireless network consisting of nodes A to E. The nodes A to E are located within a predetermined area of a beacon section to transmit beacons. Referring to FIG. 1, the node A transmits beacons to the nodes B to E, and the node B transmits beacons to the nodes A and C. The node C transmits beacons to the nodes A and B, and the node D transmits beacons to the nodes A and E. The node E transmits beacons to the nodes A and D. The node C transmits data to the node B during a reserved time slot, and the node E transmits data to the node D during a reserved time slot.

FIG. 2 illustrates a super frame used in the nodes of the wireless network. As shown in FIG. 2, the super frame consists of 256 time slots for beacons and data. The nodes in the wireless network require synchronization information to synchronize with one another. Therefore, the node transmits a beacon to its neighboring nodes with the synchronous information being contained in a certain area of the beacon. The node that wishes to transmit data uses a reserved one among the 256 time slots to transmit the data.

For example, if the node C uses the time slot 2 to transmit data, the node B receives the data during the time slot 2. If the node E uses the time slot 3 to transmit data, the node D receives the data during the time slot 3. Generally, a sender node searches for a time slot its neighboring nodes have not reserved and asks a corresponding receiver node whether it is possible to reserve the searched time slot. If it is possible to reserve the time slot in question, the receiver node notifies the sender node of that the reservation of the time slot is allowed. If it is impossible to reserve the time slot in question, the receiver node notifies the sender node of that the reservation of the time slot is canceled. If the sender node and the receiver node agree with the reservation of the time slot, the sender node transmits data to the receiver node during the reserved time slot.

FIG. 3 illustrates an active period and an inactive period of the node C for transmitting data and the node B for receiving data. FIG. 3 also illustrates a super frame consisting of a beacon transmission section and a plurality of time slots. In this example, it is assumed that the node C has reserved the time slot 0 and the time slot 1 to transmit data to the node B.

The node C enters an active state during the reserved time slot 0 and time slot 1 to transmit data to the node B. The node B enters an active state during the reserved time slot 0 and time slot 1 to receive the data from the node C. However, the node C may not transmit all of the necessary data during the time slot 0 and the time slot 1. For example, if a wireless channel condition between the nodes C and B becomes worse, the node C may not transmit the necessary data. The node C has to remain in the active state even during the time slot 2 and the time slot 3 to know if the time slot reserved by nodes other than the node C is available. If a certain node reserves the time slot 2 and the time slot 3 but does not use the time slot 2 and the time slot 3, the node C transmits data during the time slot 2 and the time slot 3. The node B remains in the active state during the reserved time slot 0 and time slot 1, and returns to inactive state during the time slot 2 and the time slot 3. Accordingly, the node B can prevent unnecessary power consumption.

However, if a power of the node C is less than a predetermined set value, the node C wastes the power because the node C remains in the active state during the time slot 2 and the time slot 3 regardless of the state of the node B. Also, when the sender node C remains in the active state to transmit data although the receiver node B is in the inactive state, unnecessary power consumption is caused by the sender node C. Also, since another nodes wish to use the time slots 2 and 3 but they are not allowed to use the time slots 2 and 3, a wireless resource is wasted.

SUMMARY OF THE INVENTION

The present invention has been developed in order to solve the above problems in the related art. Accordingly, it is an aspect of the present invention to provide a method and system in which a sender node reserves a time slot to enable a receiver node to receive multicast data without an error.

It is another aspect of the present invention to provide a method and system in which a sender node is capable of using a time slot excluding its reserved time slot to transmit data, thereby improving data transmission efficiency.

The above aspects are achieved by providing a method for determining a state of a first node in a wireless network consisting of a plurality of nodes. The method comprises determining one of at least two power sensitivity levels by considering at least one of an available power and a standby packet, and determining whether the first node remains in active state or inactive state by considering a power sensitivity level transmitted from at least one second node which corresponds to the first node and the determined power sensitivity level.

Also, the above aspect is achieved by providing a system for determining a state of a first node in a wireless network consisting of a plurality of nodes. The system comprises a first node determining one of at least two power sensitivity levels by considering at least one of an available power and a standby packet, the first node determining whether the first node remains in an active state or an inactive state by considering a power sensitivity level transmitted from at least one second node which corresponds to the first node and the determined power sensitivity level, and the second node having an identical state to the first node.

BRIEF DESCRIPTION OF THE DRAWINGS

FIG. 4 is a view illustrating a power-saving method of a node of a wireless network according to an embodiment of the present invention; and FIG. 5 is a view illustrating a power-saving method of a node of a wireless network according to an embodiment of the present invention.

DETAILED DESCRIPTION OF AN EXEMPLARY EMBODIMENT

Figure 1:
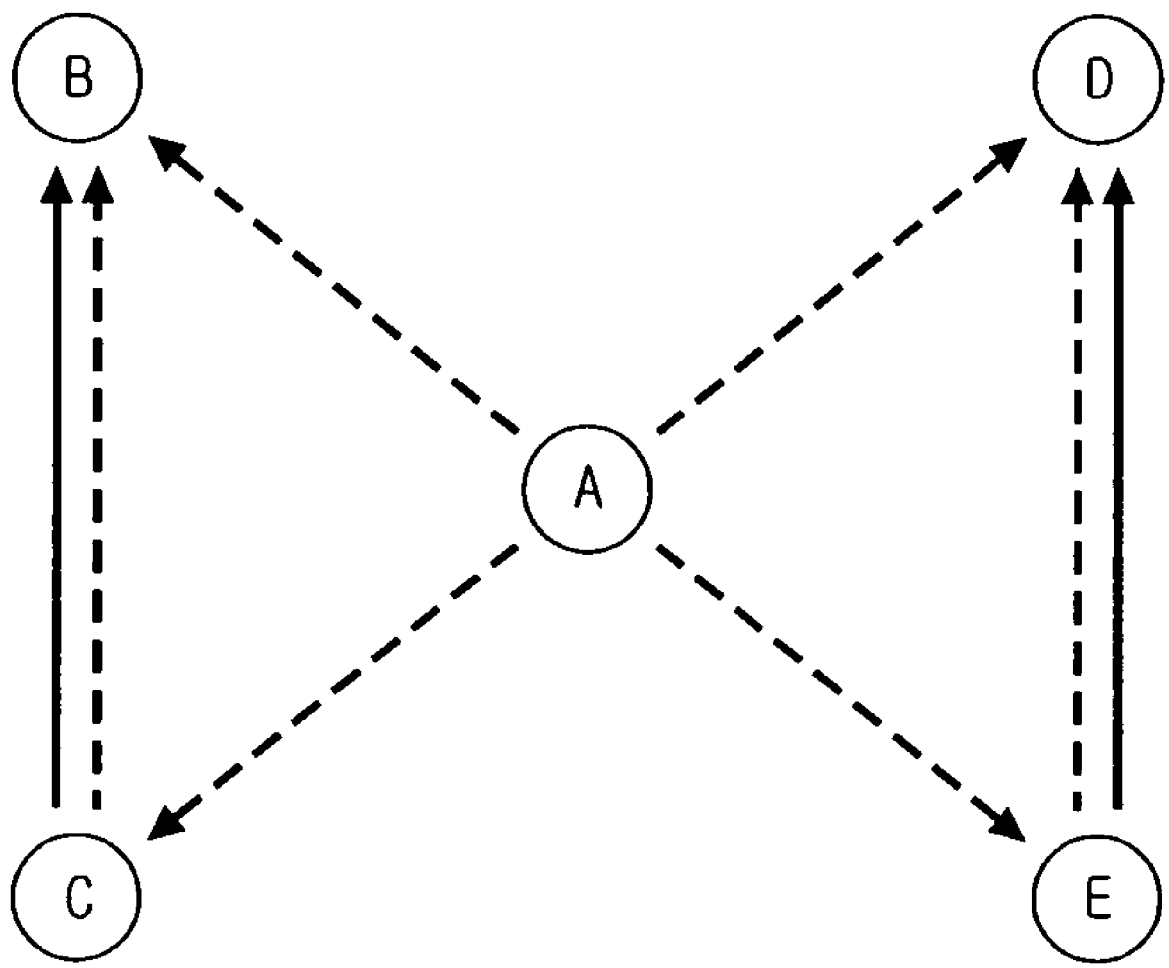
FIG. 1 is a view illustrating a wireless network consisting of a plurality of nodes.
Figures 2, 3:
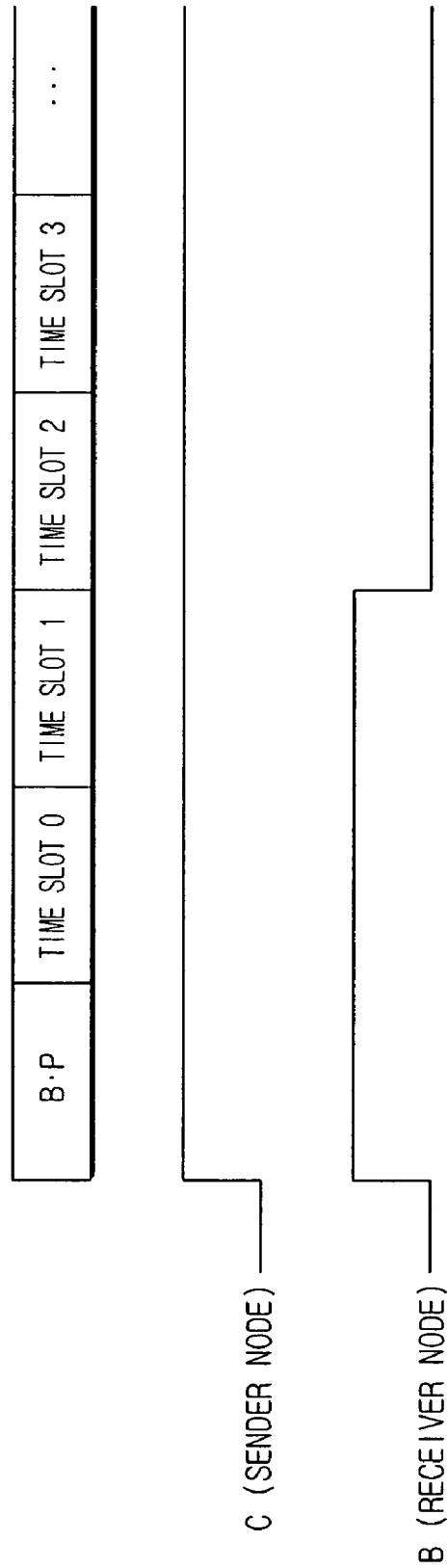
FIG. 2 is a view illustrating a structure of a super frame used by the node in the wireless network.
FIG. 3 is a view illustrating one example of unnecessary power consumption at the node of the conventional wireless network.

Hereinafter, the preset invention will now be described in greater detail with reference to the accompanying drawings.

The present invention suggests a power sensitivity level concept. The power sensitivity level is determined by considering a power remaining in a node and a standby packet. A node determines whether it remains in an active state or an inactive state according to the power sensitivity level. In this embodiment, the number of the power sensitivity levels is set to four (4). However, this should not be considered as limiting. The number of the power sensitivity levels can be determined according to a user's setting. The power sensitivity levels may be set as many as possible so that the power sensitivity can be measured more precisely. Each node measures its power sensitivity level. The power sensitivity level can be expressed by 2 bits because the number of the power sensitivity levels is set to 4. If the number of the power sensitivity levels exceeds 4, the number of bits for expressing the power sensitivity level increases. The following table 1 shows the power sensitivity level.

TABLE 1

| Power Sensitivity Level | Bit |
| --- | --- |
| Level 1 | 00 |
| Level 2 | 01 |
| Level 3 | 10 |
| Level 4 | 11 |

Hereinafter, a method for determining a state of a node in a wireless network without considering neighboring nodes will now be described.

A node 1 having the power sensitivity level 1 remains in an active state during its reserved time slot. That is, the node 1 remains in an active state during its reserved time slot to transmit and receive data. Also, the node 1 remains in an active state during an EDCA (Enhanced Distributed Channel Access) slot or a non-reserved time slot if it is necessary for the node 1 to receive or transmit broadcast data or asynchronous data. The respective nodes perform the same operation during the EDCA slot and the non-reserved slot. The EDCA slot is a channel access slot based on competition. That is, the EDCA slot determines a priority according to the kind of data to be transmitted to a node which has requested for reservation. For example, the EDCA slot assigns a high priority to the broadcast data or the asynchronous data and assigns a low priority to unicast data.

A node 2 having the power sensitivity level 2 remains in an active state during its reserved time slot. Also, the node 2 having the power sensitivity level 2 remains in an active state during the EDCA slot.

A node 3 having the power sensitivity level 3 remains in an active state during its reserved time slot. Also, the node 3 having the power sensitivity level 3 remains in an active state during the EDCA slot and a soft reservation slot which is reserved by a node other than the node 3. A reservation slot is divided into a soft reservation slot and a hard reservation slot. The soft reservation slot is a slot that can be used by a node which does not reserve the slot without transferring any message. The hard reservation slot transmits a message when a node reserves a slot but does not use the slot, so that the hard reservation slot can be used by a node that does not reserve the slot.

A node 4 having the power sensitivity level 4 remains in an active state during its reserved time slot. The node 4 having the power sensitivity level 4 remains in an active state during the EDCA slot, and the soft reservation slot and the hard reservation slot of a node other than the node 4.

Each node transmits to its neighboring nodes a beacon that contains information on the power sensitivity level thereof within a beacon transmission section. Accordingly, each node of the wireless network can perceive the power sensitivity level of its neighboring node in addition to the power sensitivity level thereof.

Hereinafter, a method for determining a state of a node in a wireless network by considering a power sensitivity level of a corresponding node will now be described. If the node is for transmitting data, the corresponding node is for receiving the data. If the node is for receiving data, the corresponding node is for transmitting the data. The node remains in an active state during its reserved time slot regardless of the power sensitivity level.

A node 1 having the power sensitivity level 1 remains in an active state if it is necessary for the node 1 to transmit and receive broadcast data or asynchronous data. Otherwise, the node 1 remains in an inactive state.

A node 2 having the power sensitivity 2 determines whether it remains in an active state or an inactive state according to the power sensitivity level of its corresponding node during the EDCA slot. That is, if a corresponding node has a power sensitivity level 1 during the EDCA slot and if broadcast data or asynchronous data is not generated, the node 2 remains in an inactive state, and otherwise, the node 2 remains in an active state. Also, the node 2 having the power sensitivity level 2 remains in an inactive state during the soft reservation slot and the hard slot reservation slot which are reserved by a node other than the node 2 and the corresponding node regardless of the power sensitivity level of the corresponding node.

A node 3 having the power sensitivity level 3 determines whether it remains in an active state or an inactive state according to the power sensitivity level of its corresponding node during the EDCA slot. That is, if the corresponding node has a power sensitivity level 1 during the EDCA slot and if broadcast data or asynchronous data is not generated, the node 3 remains in an inactive state, and otherwise, the node 3 remains in an active state. Also, if the corresponding node has a power sensitivity level 1 or 2, the node 3 having the power sensitivity level of 3 remains in an inactive state during the soft reservation slot reserved by a node other than the node 3 and corresponding node, and otherwise, the node 3 remains in an active state. The node 3 having the power sensitivity level 3 remains in an inactive state during the hard reservation slot reserved by a node other than the node 3 regardless of the power sensitivity level of the corresponding node.

A node 4 having the power sensitivity level 4 determines whether it remains in an active state or an inactive state according to the power sensitivity level of its corresponding node during the EDCA slot. That is, if the corresponding node has a power sensitivity level 1 during the EDCA slot and if broadcast data or asynchronous data is not generated, the node 4 remains in an inactive state, and otherwise, the node 4 remains in an active state. Also, if the corresponding node has the power sensitivity level 1 or 2 during the soft reservation slot reserved by a node other than the node 4, the node 4 having the power sensitivity level 4 remains in an inactive state, and otherwise, the node 4 remains in an active state. If the corresponding node has the power sensitivity level of 1, 2, or 3 during the hard reservation slot reserved by a node other than the node 4, the node 4 having the power sensitivity level of 4 remains in an inactive state, and otherwise, the node 4 remains in an active state.

Hereinafter, a method of switching between an active state and an inactive state in a wireless network to solve a power-consumption problem in the related art will now be described.

FIG. 4 illustrates a network consisting of nodes A to E by way of an example. The node A has a power sensitivity level 1, the nodes B and C have a power sensitivity level 2, and the nodes D and E have a power sensitivity level 3. The node A reserves a time slot 0 in order to transmit data to the node B, and the node B reserves a time slot 2 in order to transmit data to the node C. The node E reserves a time slot 3 in order to transmit data to the node D. Also, it is assumed that the node C does not reserve any time slot for the data transmission but asynchronous data to be transmitted to the node E is generated. The following table 2 shows active/inactive states of the respective nodes according to the time slots 0 to 3.

TABLE 2

|  | Time Slot 0 | Time Slot 1 | Time Slot 2 | Time Slot 3 |
| --- | --- | --- | --- | --- |
| Node A (Power sensitivity level 1) | Active | Inactive | Inactive | Inactive |
| Node B (Power sensitivity level 2) | Active | Active | Active | Inactive |
| Node C (Power sensitivity level 2) | Inactive | Active | Active | Inactive |
| Node D (Power sensitivity level 3) | Active | Active | Inactive | Active |
| Node E (Power sensitivity level 3) | Active | Active | Inactive | Active |

As shown in table 2, the node A and the node B remain in an active state during their reserved time slot 0. However, since the node A has the power sensitivity level 1, the nodes A and B remain in an inactive state during a hard reservation slot (time slot 2) and a soft reservation slot (time slot 3) which are reserved by a node other than nodes A and B. The nodes A and B remain in an inactive state during the EDCA slot (time slot 1) since broadcast data or asynchronous data is not generated.

The nodes B and C remain in an active state during their reserved time slot 2. The nodes B and C remain in an active state during the time slot 1 because they have the power sensitivity level 2. The nodes B and C remain in an inactive state during the soft reservation slot reserved by a node other than nodes B and C (time slot 0 and time slot 3).

The nodes D and E remain in an active state during their reserved time slot 3. Since the node D and the node E have the power sensitivity level 3, they remain in an active state during the time slot 1 and the time slot 3. The nodes D and E remain in an inactive state during the hard reservation slot reserved by a node other than the nodes D and E (time slot 2).

Since the node C has the power sensitivity level 2 and the node E has the power sensitivity level 3, the nodes C and E determine whether they remain in an active state or an inactive state by using the node C which is lower than the node E in the power sensitivity level. Accordingly, the nodes C and E remain in an active state during the time slot 1 and remain in an inactive state during the time slot 0, the time slot 2 and the time slot 3.

If one certain node can remain both in an active state and an inactive state during a specific time slot, the node remains in an active state in an exemplary embodiment.

FIG. 5 illustrates a wireless network consisting of nodes A to H. The node A has a power sensitivity level 1, and the nodes B and C have a power sensitivity level 2. The nodes D, E and G have a power sensitivity level 3, and the nodes F and H have a power sensitivity level 4. The node A reserves a time slot 0 in order to transmit data to the node B, and the node E reserves a time slot 1 in order to transmit data to the node F. The node G reserves a time slot 2 in order to transmit data to the node H. Also, it is assumed that the node C does not reserve any time slot for data transmission but asynchronous data to be transmitted to the node D is generated. The following table 3 shows active/inactive states of the respective nodes according to the time slots 0 to 3.

TABLE

|  | Time Slot 0 | Time Slot 1 | Time Slot 2 | Time Slot 3 |
| --- | --- | --- | --- | --- |
| Node A (Power Sensitivity level 1) | Active | Inactive | Inactive | Inactive |
| Node B (Power Sensitivity level 2) | Active | Inactive | Inactive | Inactive |
| Node C (Power Sensitivity level 2) | Inactive | Inactive | Inactive | Active |
| Node D (Power Sensitivity level 3) | Inactive | Inactive | Inactive | Active |
| Node E (Power Sensitivity level 3) | Active | Active | Active | Active |
| Node F (Power Sensitivity level 4) | Active | Active | Active | Active |
| Node G (Power Sensitivity level 3) | Active | Inactive | Active | Active |
| Node H (Power Sensitivity level 4) | Active | Inactive | Active | Active |

Referring to table 3, the nodes A and B remain in an active state during their reserved time slot 0. However, since the node A has the power sensitivity level 1, the nodes A and B remain in an inactive state during a hard reservation slot (time slot 1) and a soft reservation slot (time slot 2) which are reserved by a node other than the nodes A and B. The nodes A and B remains in an inactive state during the time slot 3 which is an EDCA slot because broadcast data or asynchronous data is not generated The nodes E and F remain in an active state during their reserved time slot 1. Since the node E has the power sensitivity level 3, the nodes E and F remain in an active state during the soft reservation slot (time slot 0 and time slot 2) which are reserved by a node other than the nodes E and F and the EDCA slot (time slot 3).

The nodes G and H remain in an active state during their reserved time slot 2. Since the node G has the power sensitivity level 3, the nodes G and H remains in an active state during the soft reservation time slot (time slot 0) reserved by a node other than the nodes G and H and the EDCA slot (time slot 3), and remain in an inactive state during the hard reservation slot (time slot 1) reserved by a node other than the nodes G and H.

Since the node C has the power sensitivity level 2 and the node D has the power sensitivity level 3, the nodes C and D determine whether they remains in an active state or an inactive state by using the node C that is lower in the power sensitivity level than the node D. Accordingly, the nodes C and D remain in an active state during the time slot 3 and remains in an inactive state during the time slot 0, time slot 1 and the time slot 2.

The nodes A to H each transmit data during its reserved time slot. If a certain node reserves a time slot but does not use the reserved time slot, the time slot is available to other nodes. For example, if the nodes A and B do not use the time slot 0, the time slot 0 is available to the node E, the node F, the node G, and the node H.

As described above, since the state of the sender node is identical to that of the receiver node, unnecessary power consumption can be prevented. That is, when the sender node remains in an active state, the receiver node remains in an active state too. Also, since the node determines its state by taking into consideration both its power sensitivity level and the power sensitivity level of its corresponding node, the power can be effectively used.

The foregoing embodiment and advantages are merely exemplary and are not to be construed as limiting the present invention. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for determining a state of a first node in a wireless network consisting of a plurality of nodes, the method comprising:
   determining one of at least two power sensitivity levels as a determined power sensitivity level by considering at least one of an available power and a standby packet;
   receiving a power level sensitivity level transmitted from at least one second node which corresponds to the first node; and
   determining whether the first node remains in an active state or an inactive state by considering the transmitted power sensitivity level and the determined power sensitivity level,
   wherein a lower one of the transmitted power sensitivity level and the determined power sensitivity level is a lower power sensitivity level, and wherein the power sensitivity level comprises one of four power sensitivity levels 1, 2, 3, and 4, the four sensitivity levels increasing with power sensitivity level number, and if the lower power sensitivity level is 1 and a broadcast data or an asynchronous data is generated, the first node remains in the active state during a non-reserved time slot.

2. The method as claimed in claim 1, wherein the state of the first node is identical to a state of the second node.

3. The method as claimed in claim 1, wherein the power sensitivity level consists of 2 bits, and is added to a beacon to be transmitted to the second node.

4. The method as claimed in claim 1, wherein a state of a time slot comprises one of a time slot reserved by the first or the second node, a soft reservation slot reserved by a node other than the first or the second node, a hard reservation slot reserved by the node other than the first or the second node, and the non-reserved time slot.

5. The method as claimed in claim 4, wherein the first node remains in the active state during the time slot reserved by the first node without considering the determined power sensitivity level.

6. The method as claimed in claim 4, wherein the first node determines whether the first node remains in the active state or the inactive state by considering the state of the time slot.

7. The method as claimed in claim 1, wherein if the lower power sensitivity level is 2, the first node remains in the active state during the non-reserved time slot.

8. The method as claimed in claim 1, wherein if the lower power sensitivity level is 3, the first node remains in the active state during a time slot excluding a hard reservation time slot that is reserved by a node other than the first node or the second node.

9. The method as claimed in claim 1, wherein if the lower power sensitivity level is 4, the first node remains in the active state during all time slots.

10. A system for determining a state of a first node in a wireless network consisting of a plurality of nodes, the system comprising:
    a first node determining one of at least two power sensitivity levels as a determined power sensitivity level by considering at least one of an available power and a standby packet, the first node receiving a power sensitivity level transmitted from at least one second node which corresponds to the first node, the first node determining whether the first node remains in an active state or an inactive state by considering the transmitted power sensitivity level transmitted and the determined power sensitivity level; and
    the second node having an identical state to the first,
    wherein a lower one of the transmitted power sensitivity level and the determined power sensitivity level is a lower power sensitivity level, and wherein the power sensitivity level comprises one of four power sensitivity levels 1, 2, 3, and 4, the four sensitivity levels increasing with power sensitivity level number, and if the lower power sensitivity level is 1 and a broadcast data or an asynchronous data is generated, the first node remains in the active state during a non-reserved time slot.

11. A system for determining a state of a first node in a wireless network consisting of a plurality of nodes, the system comprising:
    a first node determining one of at least two power sensitivity levels as a determined power sensitivity level by considering at least one of an available power and a standby packet, the first node receiving a power sensitivity level transmitted from at least one second node which corresponds to the first node, the first node determining whether the first node remains in an active state or an inactive state by considering the transmitted power sensitivity level transmitted and the determined power sensitivity level; and
    the second node having an identical state to the first node,
    wherein a lower one of the transmitted power sensitivity level and the determined power sensitivity level is a lower power sensitivity level, and wherein the power sensitivity level comprises one of four power sensitivity levels 1, 2, 3, and 4, the four sensitivity levels increasing with power sensitivity level number, and if the lower power sensitivity level is 2, the first node remains in the active state during a non-reserved time slot.

12. A system for determining a state of a first node in a wireless network consisting of a plurality of nodes, the system comprising:
    a first node determining one of at least two power sensitivity levels as a determined power sensitivity level by considering at least one of an available power and a standby packet, the first node receiving a power sensitivity level transmitted from at least one second node which corresponds to the first node, the first node determining whether the first node remains in an active state or an inactive state by considering the transmitted power sensitivity level transmitted and the determined power sensitivity level; and
    the second node having an identical state to the first node, wherein a lower one of the transmitted power sensitivity level and the determined power sensitivity level is a lower power sensitivity level, and wherein the power sensitivity level comprises one of four power sensitivity levels 1, 2, 3, and 4, the four sensitivity levels increasing with power sensitivity level number, and if the lower power sensitivity level is 3, the first node remains in the active state during a time slot excluding a hard reservation time slot that is reserved by a node other than the first node or the second node.

13. A system for determining a state of a first node in a wireless network consisting of a plurality of nodes, the system comprising:
    a first node determining one of at least two power sensitivity levels as a determined power sensitivity level by considering at least one of an available power and a standby packet, the first node receiving a power sensitivity level transmitted from at least one second node which corresponds to the first node, the first node determining whether the first node remains in an active state or an inactive state by considering the transmitted power sensitivity level transmitted and the determined power sensitivity level; and
    the second node having an identical state to the first node, wherein a lower one of the transmitted power sensitivity level and the determined power sensitivity level is a lower power sensitivity level, and wherein the power sensitivity level comprises one of four power sensitivity levels 1, 2, 3, and 4, the four sensitivity levels increasing with power sensitivity level number, and if the lower power sensitivity level is 4, the first node remains in the active state during all time slots.

* * * * *